United States Patent [19]

Larsen

[11] 3,805,045

[45] Apr. 16, 1974

[54] BINARY CARRY LOOKAHEAD ADDER USING REDUNDANCY TERMS

[75] Inventor: Dee E. Larsen, San Jose, Calif.

[73] Assignee: Amdahl Corporation, Sunnyvale, Calif.

[22] Filed: Oct. 30, 1972

[21] Appl. No.: 302,228

[52] U.S. Cl. .................... 235/175
[51] Int. Cl. .................... G06f 7/50
[58] Field of Search .................... 235/175

[56] References Cited

UNITED STATES PATENTS

| | | | |
|---|---|---|---|
| 3,566,098 | 2/1971 | Kono | 235/175 |
| 3,697,735 | 10/1972 | Hanson | 235/175 |
| 3,700,875 | 10/1972 | Saenger | 235/175 |

OTHER PUBLICATIONS

R. M. Wade, "Binary Adder with Quaternary Lookahead," IMB Tech. Disclosure Bulletin, Vol. 7, No. 11, Apr. 1955, pp. 1006–1008.

R. B. Anderson, "Five-Level Combinations Sum Predict & Carry Propagate Adder," IMB Tech. Disc. Bulletin, June 1971, pp. 112–113.

R. B. Anderson, "64-Bit Adder," IMB Tech. Disclosure Bulletin, Vol. 14, No. 10. March 1972, pp. 2939–2941.

*Primary Examiner*—Malcolm A. Morrison
*Assistant Examiner*—David H. Malzahn
*Attorney, Agent, or Firm*—Flehr, Hohbach, Test, Albritton & Herbert

[57] ABSTRACT

Disclosed is an adder for use in a data processing system. The adder includes five levels of logic circuits for forming bit propagate, bit generate, group propagate, half-sum internal carry and full-sum terms. Additionally, redundancy Z terms are introduced which, together with bunch propagates and bunch generates produce external carries which are combined to generate the full-sum terms. The inclusion of redundancy in terms enables a factoring of terms which reduces the fan-in and fan-out requirements within the adder.

5 Claims, 10 Drawing Figures

BINARY CARRY LOOKAHEAD ADDER USING REDUNDANCY TERMS

CROSS REFERENCE TO RELATED APPLICATION

DATA PROCESSING SYSTEM, Ser. No. 302,221, filed Oct. 30, 1972, invented by Gene M. Amdahl, Glenn D. Grant and Robert M. Maier, assigned to Amdahl Corporation.

BACKGROUND OF THE INVENTION

The present invention relates to the field of adders in data processing systems and particularly to the field of carry-lookahead adders.

Carry-lookahead adders are employed in data processing systems where it is desirable to do high-speed additions of operands. In general, the input bits *ai* of a first operand A and the input bits *bi* of a second operand B may be respectively logically OR'ed to form propagate bits *pi* and logically AND'ed to form generate bits *pi*. For 40-bit operands, *i* ranges from zero to 39. Half-sums, group propagates, group generates and carries may be formed from the bit propagates and bit generates. The group propagate, group generate, half-sums and carries are then logically combined to form the full sums.

Where four bit groups are employed, the 10 carries C(0), . . . ,C(9) may be generated in a number of ways. For example, the carry C(0) is given by the following equation:

C(0) = (*p*0–*p*38) (*g*39)
V(*p*0–*p*37) (*g*38)
V(*p*0–*p*36) (*g*37)
V(*p*0–*p*35) (*g*36)
.
.
.
V(*p*0–*p*2) (*g*3)
V(*p*0) (*p*1) (*g*2)
V(*p*0) (*g*1)
V(*g*0)

In the above equation, (*p*0–*p*38) implies the logical AND of the terms *p*0, *p*1, . . . , *p*39 which together are AND'ed with the term (*g*39) where the symbol V implies the logical OR so that the AND'ed terms (*p*0–*p*38) (*g*39) and the AND'ed terms (*p*0–*p*37) (*g*38) are logically OR'ed. The C(0) term is formed, theefore, of the logical OR of 40 AND'ed terms.

One implementation of the C(0) carry term is using a 40-input AND gate for the term (*p*0–*p*38) (*g*39), a 39-input AND gate for the term (*p*0–*p*37) (*g*38), a 38-input AND gate for the term (*p*0–*p*36) (*g*37), and so forth down to a two-input AND gate for the term (*p*0) (*g*1) and combining the output of the various AND gates into a 40-input OR gate.

In a similar manner, the carry C1 can be implemented with a 36-input OR gate corresponding to the 36 terms of the following equation where the first term (*p*4–*p*38) (*g*39) can be implemented with a 36-input AND gate and the second term with a 35-input AND gate and so on:

C(1) = (*p*4–*p*38) (*g*39)
V(*p*4–*p*37) (*g*38)
.
.
.
V(*p*4–*p*5) (*g*6)
V(*p*4) (*g*5)
V(*g*4)

Finally, the carry term C(9) can be implemented with a 4 input OR gate and three AND gates of four-, three-, and two-inputs where the C(9) term is given by the following equation:

C(9) = (*p*36–*p*38) (*g*39)
V(*p*36–*p*37) (*g*38)
V(*p*36) (*g*37)
V(*g*36)

While the carries can be implemented using the logical AND and the logical OR functions indicated, circuits for those functions cannot be conveniently implemented with single logic levels because of the fan-in and fan-out limits of present day technology. In order to implement the carries dictated by the above equations, it is desirable to minimize the number of logic levels employed, minimize the number of logic circuits employed and to operate within the fan-in and fan-out limitations of the logic circuits employed.

SUMMARY OF THE INVENTION

The present invention is an adder and method of addition for use in a data processing system. The invention employs redundancy terms in generating the carry terms which are inputs used to generate the final sum. The carry terms are generated as a logical combination of the bit propagate signals pi and the bit generate signals gi where the redundancy relationships are employed as follows:

$(\overline{pi})\ (\overline{gi}) = (\overline{pi})$
$\equiv(-pi) = (-pi)\ (-gi)$ The redundancy relationships are employed in forming redundancy terms, called Z terms, which are logically AND'ed and logically OR'ed with the bit propagate and bit generate terms so as to reduce the fan-in and fan-out requirement of the carry generation circuitry.

In one particular example of the present invention, operand A having bits *a*1, *a*2, . . . , *a*39, and operand B having bits *b*0, *b*1, . . . ,*b*39, have their respective bits ai and bi logically OR'ed to form the bit propagates *pi* and are logically AND'ed to form the bit generates *gi*. In accordance with the present invention, negative redundancy terms are formed as follows:

Z(0) (0,3), Z(1) (0,3); Z(0) (4,7), Z(1) (4,7); Z(0) (8,11),
Z(1) (8,11); Z(0) (12,15), Z(1) (12,15); Z(0) (16,19),
Z(1) (16,19); Z(0) (20,23), Z(1) (20,23); Z(0) (24,27),
Z(1) (24,27); Z(0) (28,31), Z(1) (28,31); Z(0) (32,35),
Z(1) (32,35) and Z(0) (36,39), Z(1) (36,39).

The Z(1) redundancy terms are logically AND'ed and logically OR'ed with the bunch propagate terms BP*i* to form the positive external carries +C*e*(0), +C*e*(1), . . . ,+C*e*(9) as follows:

+C*e*(0) = (*p*0–*p*36)Z(1) (36,39)
V(*p*0–*p*32)Z(1) (32,35)
.
.
.
V(*p*0–*p*4)Z(1) (4,7)
V(*p*0)Z(1) (0,3)

$+Ce(1) = (p4\text{–}p36)Z(1)\ (36,39)$
$V(p4\text{–}p32)Z(1)\ (32,35)$
.
.
.
$V(p4)Z(1)\ (4,7)$
.
.
.
$Ce(9) = (p36)Z(1)\ (36,39)$ In a similar manner, the negative external carries are generated using the bunch generate terms BG*i* and the Z(0) redundancy terms.

In accordance with the above summary, the present invention achieves the objective of providing an improved carry-propagate adder which, by relying upon redundancy terms allows a factoring which enables the fan-in/fan-out requirements to be reduced.

Additional objects and features of the invention will appear from the following description in which the preferred embodiments of the invention have been set forth in detail in conjunction with the drawings.

EXECUTION UNIT

Figure 3:
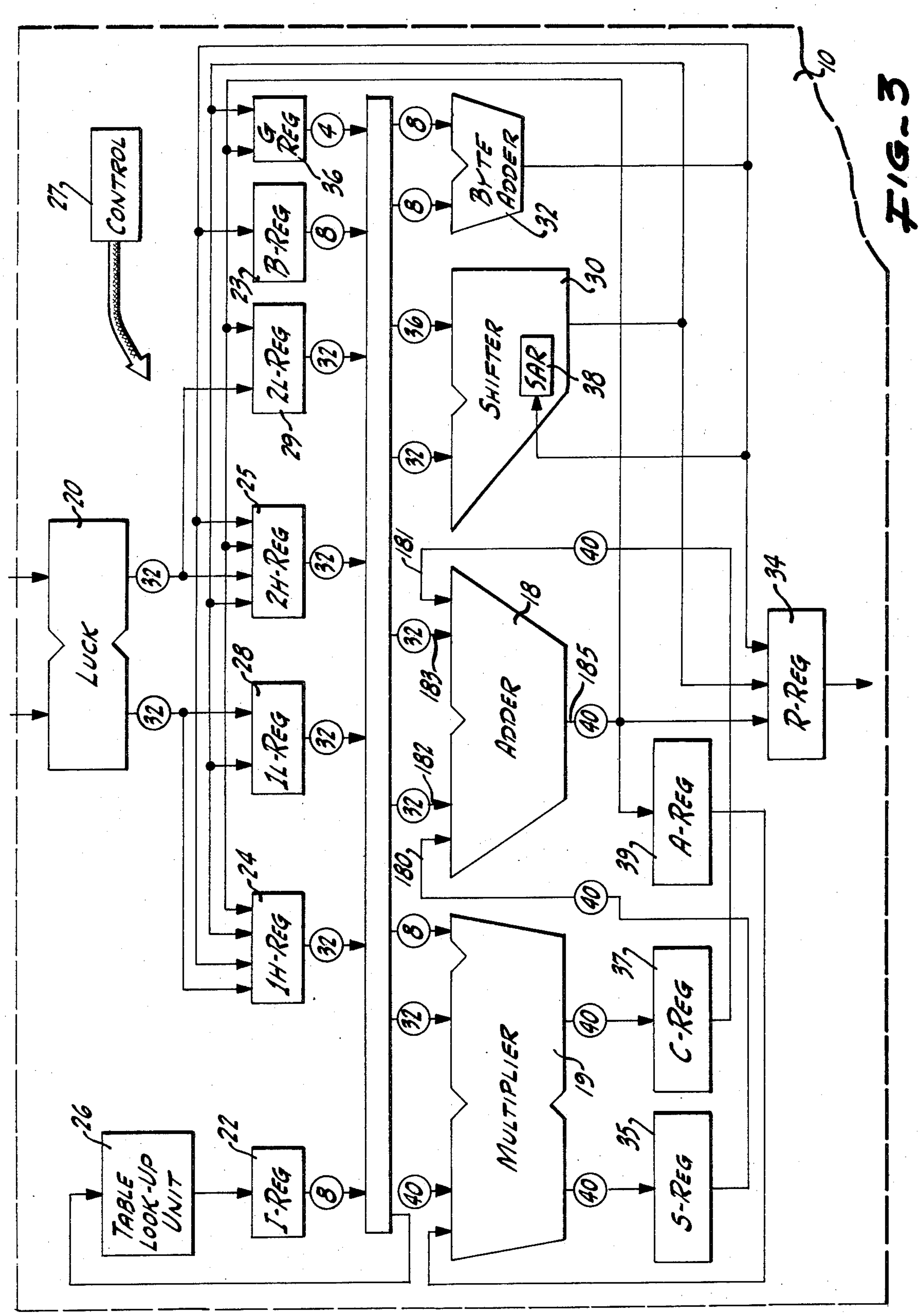
FIG. 3 depicts a block diagram of the execution unit of the system of FIG. 1, depicting the in and out gating paths of the carry-propagate adder of the present invention.

In FIG. 3, the basic data paths of the execution unit 10, and specifically the data paths associated with the carry-propagate adder 18 of the present invention are shown.

Briefly, still referring to FIG. 3, adder 18 has a plurality of input buses 180 through 183, which are operative to transfer two input operands A and B where adder 18 functions to form the sum A + B.

The operand A is obtained from the S register 35 via 40-bit bus 180 or from one of the other registers of the data processing system via input buses 182. Similarly, operand B is received from the C register 37 via 40-bit bus 181 or from one of the other registers of the data processing system via input bus 183. Selection of which location operands A and B are obtained from is under the control of control 27, which selects the appropriate one of the ingates in level I ingates 162 shown in FIG. 2.

Still referring to FIG. 3, the 40-bit outbus 185 receives the sum A + B and transmits it principally to the 2H register 25, the 2L register 29, the A register 39, or to the R register 34. The latching of the sum A + B into the appropriate registers is also under the control of control 27 with a clocking method and apparatus referred to in the above referenced application DATA PROCESSING SYSTEM.

Figure 1:
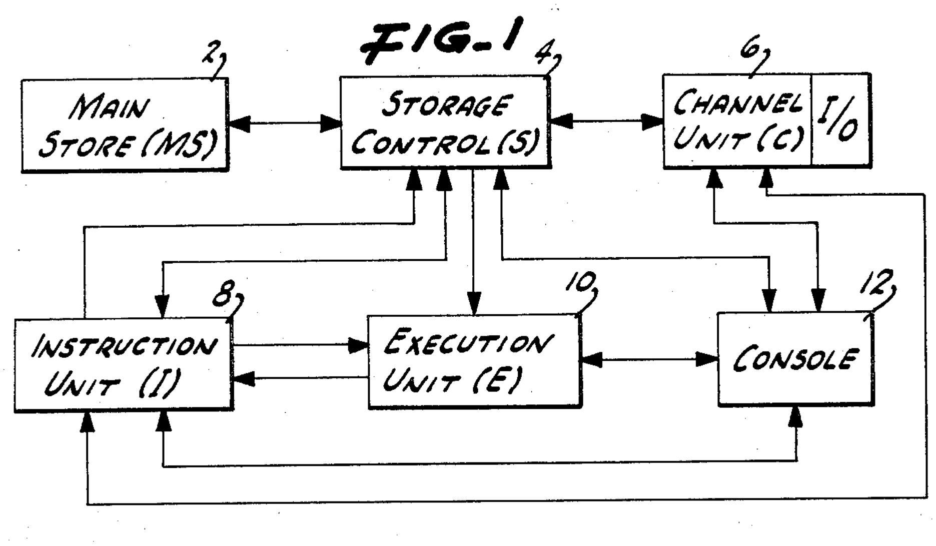
FIG. 1 depicts a block diagram of the basic environmental system which employs the carry-lookahead adder of the present invention.
Figure 2:
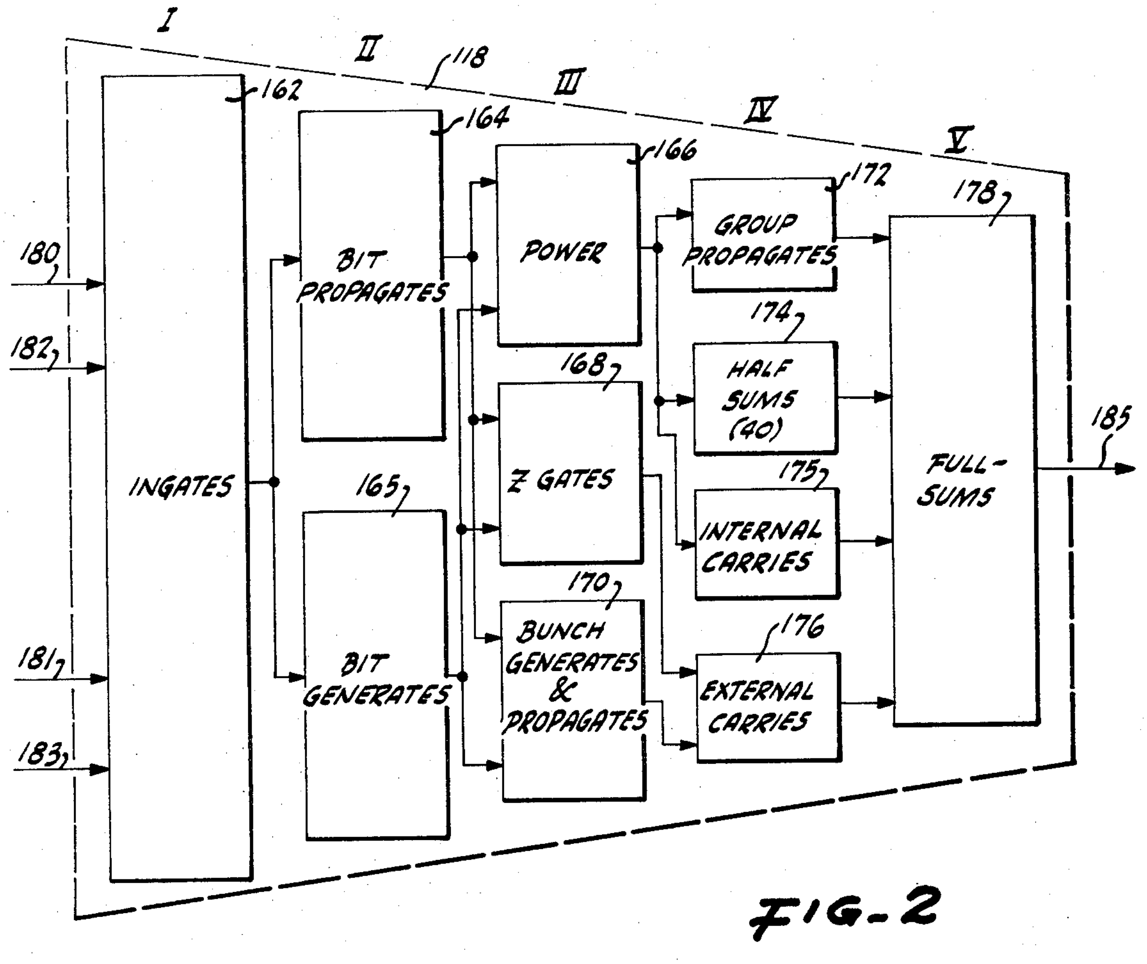
FIG. 2 depicts a block diagram of the carry-lookahead adder as it appears within the execution unit of the system of FIG. 1.

In FIG. 2, the ingates 162 receive the in buses 180 through 183 and function in a conventional manner to select the input operands A and B which are added by adder 18.

The input operand A typically includes input bits *a*0, *a*1, . . . ,*a*39 and similarly input operand B typically includes input bits *b*0, *b*1, . . . ,*b*39.

The positive and negative levels of each of these 40-input bits are connected as inputs to the bit propagates 164 and a bit generates 165. The bit propagates 164 function to form the logical OR of each respective bit *ai* and *bi*. Similarly, the bit generates 165 function to form the logical AND of the respective bits *ai* and *bi*.

The outputs from the bit propagates 164 and bit generates 165 are each connected through a power level of logic 166 which forms the identical logical output signals as from the bit propagates 164 and bit generates 165. Additionally, the bit propagates and bit generates connect as inputs to Z gates 168 and bunch propagates and generates 170. The Z gates 168 include a plurality of redundancy terms which are logically combined with the bunch propagates and generates 170. The external carries 176 function to logically combine the outputs from the Z gates 168 and the bunch propagates 170 forming external carry outputs which are connected as inputs to the full sums 178. Additionally, the bit propagates and the bit generates as powered in the power levels 166 serve as inputs to the group propagates 172, the half-sums 174 and the internal carries 175. In one specific example, the group propagates 172, the half-sums 174, the internal carries 175 and the external carries 176 are organized in four bit groups. The outputs of each of those circuits serve as the inputs to the full-sums 178 where they are logically combined to form the desired sum A + B. Further details for each of the blocks in FIG. 2 are described in connection with FIG. 4 through FIG. 10.

INGATES

Figure 4:
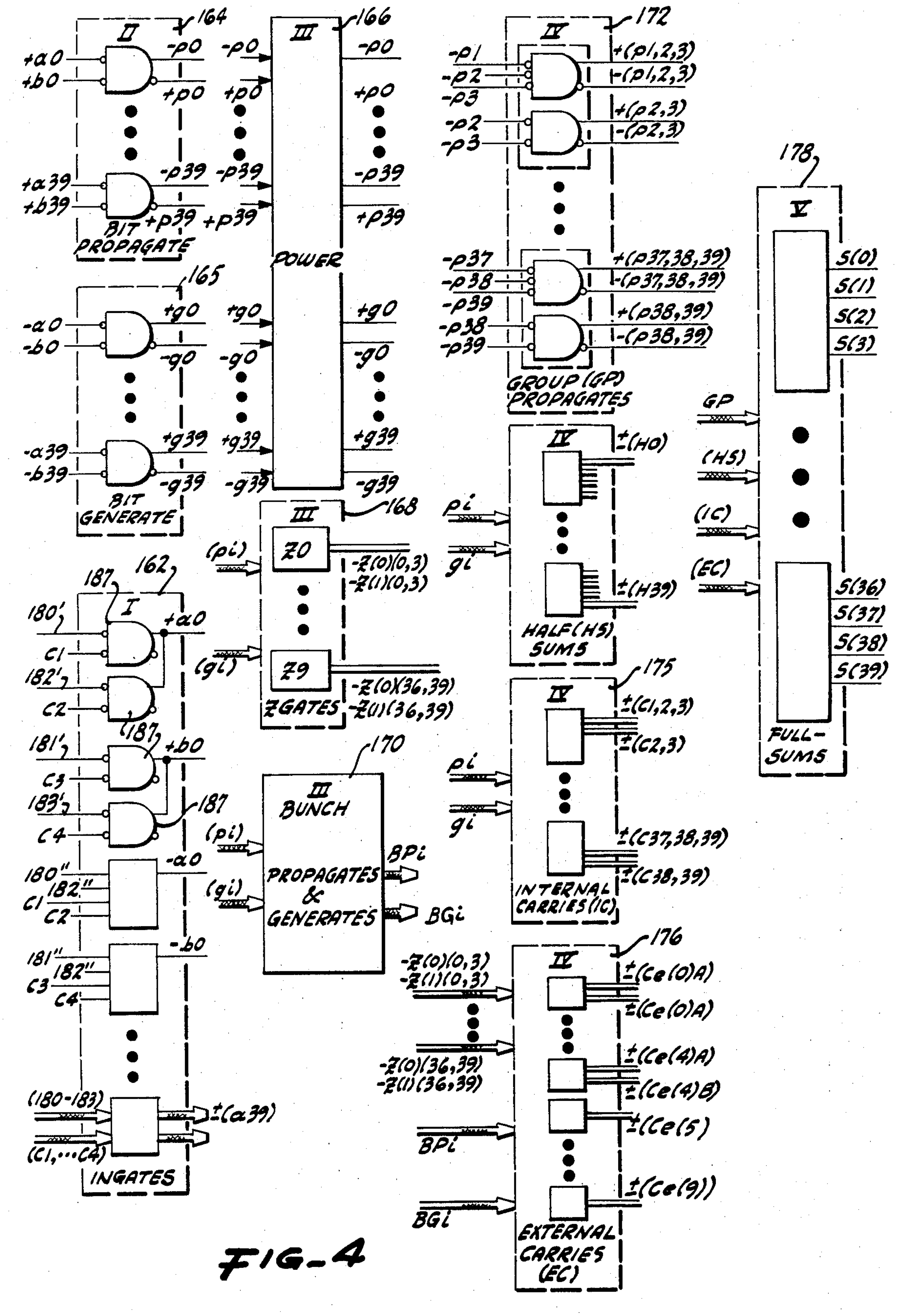
FIG. 4 depicts a schematic representation of the five levels of logic associated with the carry-lookahead adder of FIG. 2.

Referring to FIG. 4, the ingates for two typical bits +*a*0 and +*b*0 of the operands A and B, respectively, are shown. The ingates include two AND gates 187 having their outputs connected in common to form a logical OR function. The inputs to one pair of OR gates are the control signals C1 and C2, respectively, and one line 180' from the bus 180 and one line 182' from the bus 182. The output formed is the +*a*0 bit which is either the signal on line 180' or the signal on line 182', respectively, depending on which of the two control signals C1 and C2 is energized.

Similarly, the bus b0 output from the pair of gates 187 delivers the +b0 output bit from either line 181′, from the bus 181, or from line 183′, from bus 183, as a function of which of the two control lines C3 or C4 is energized, respectively. The control lines C1 through C4 are derived in a conventional manner from the control 27 in the execution unit of FIG. 3.

Still referring to FIG. 4, the ingates 162 include gates identical to gates 187 for producing the output of the negative bit signals $-a0$ and $-b0$. Similarly, all of the bits $\pm a0, \pm a1, \ldots, \pm a39$ and all of the bits $\pm b0, \pm b1, \ldots, \pm b39$ are selected from the buses 180 through 183 by the control signals C1 through C4 to appropriately ingate the desired operand A and B in a conventional manner.

POWER

The power level 166 is composed of gates which may be conventional and which function to increase the driving capability of the output signals. The power circuit 166 has the input $\pm p0$ through $\pm p39$ and $\pm g0$ through $\pm g39$, and responsively produces the outputs $\pm p0$ through $\pm p39$ and $\pm g0$ through $\pm g39$.

Z GATES

The Z gates 168, including gates Z0, Z1, . . . ,Z9 which produce the 20 outputs −Z(0) (0,3), −Z(1) (0,3); −Z(0) (4,7), −Z(1) (4,7); −Z(0) (8,11), −Z(1) (8,11); −Z(0) (12,15), −Z(1) (12,15); −Z(0) (16,19), −Z(1) (16,19); −Z(0) (20,23), −Z(1) (20,23); −Z(0) (24,27), −Z(1) (24,27); −Z(0) (28,31), −Z(1) (28,31); −Z(0) (32,35), −Z(1) (32,35); and −Z(0) (36,39), −Z(1) (36,39). These twenty outputs are generated from the bit propagate inputs, $pi$, comprising the signals $\pm p0, \pm p1, \ldots, \pm p39$ and the bit generate inputs $\pm g1, \pm g2, \ldots, \pm g39$. Specific details of the Z gates are shown and described in connection with FIG. 5.

Figure 5:
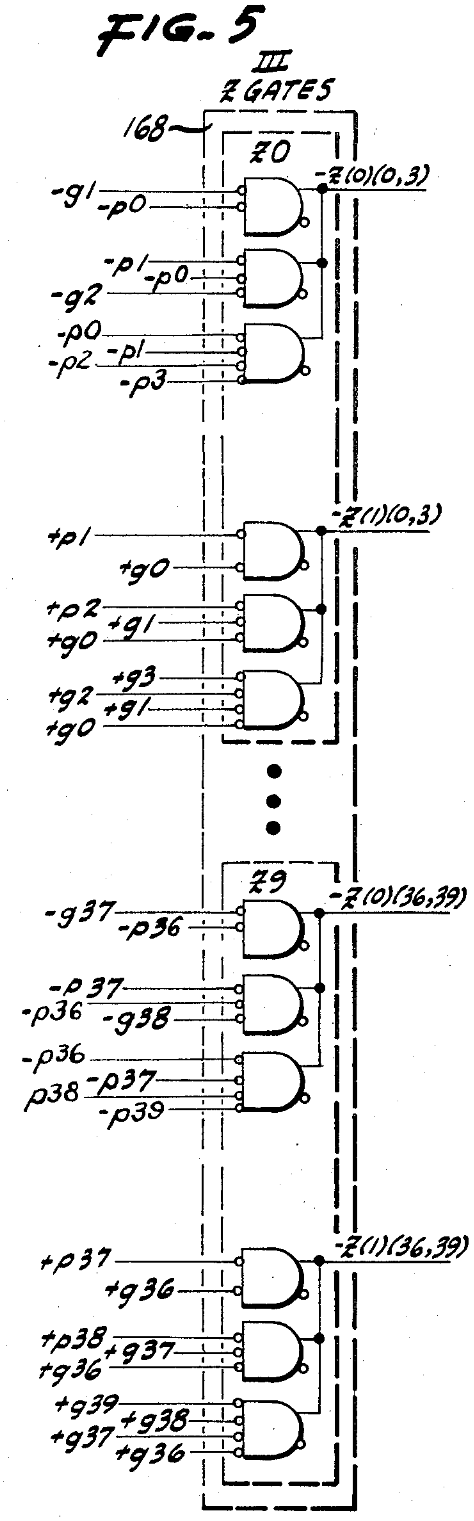
FIG. 5 depicts a schematic representation of the Z-gates employed within level III of the adder of FIG. 2.

In FIG. 5, the generation of the −Z(1) (0,3), −Z(0) (0,3), −Z(1) (36,39) and −Z(0) (36,39) term is shown as typical. In general, the gates of FIG. 5 generate the Z terms defined by the following equations:

$$-Z(0)\ (36,39) = (g37)\ (p36) V (g38)\ (p37)\ (p36) V (p39)\ (p38)\ (p37)\ (p36)$$

$$-Z(1)\ (36,39) = (\overline{p37})\ (\overline{g36}) V (\overline{p38})\ (\overline{g37})\ (\overline{g36}) V (\overline{g39})\ (\overline{g38})\ (\overline{g37})\ (\overline{g36})$$

$$-Z(0)\ (32,35) = (g33)\ (p32) V (g34)\ (p33)\ (p32) V (p35)\ (p34)\ (p33)\ (p32)$$

$$-Z(1)\ (32,35) = (\overline{p33})\ (\overline{g32}) V (\overline{p34})\ (\overline{g33})\ (\overline{g32}) V (\overline{g35})\ (\overline{g34})\ (\overline{g33})\ (\overline{g32})$$

.

.

.

$$-Z(0)\ (0,3) = (g1)\ (p0) V (g2)\ (p1)\ (p0) V (p3)\ (p2)\ (p1)\ (p0)$$

$$-Z(1)\ (0,3) = (\overline{p1})\ (\overline{g0}) V (\overline{p2})\ (\overline{g1})\ (\overline{g0}) V (\overline{g3})\ (\overline{g2})\ (\overline{g1})\ (\overline{g0})$$

It can be readily shown in accordance with Boolean algebra that the circuits of FIG. 5 produce the outputs defined by the above equations. For example, the term −Z(0) (0,3) is equal to the logical AND of the signals $(p0)$ $(p1)$, $(p2)$ and $(p3)$, the logical AND $(p0)$, $(p1)$ and $(g2)$, the logical AND of $(p0)$ and $(g1)$, the outputs of the three AND gates are logically OR'ed to form the output −Z(0) (0,3) with the additional terms. Each of the three terms of −Z(0) (0,3) corresponds to one of the three gates in the FIG. 5 −Z(0) (0,3) circuitry and the logical OR indicated by the symbol V is performed by the connection in common, called "dot" OR'ing, of the outputs of the three gates.

Figure 6:
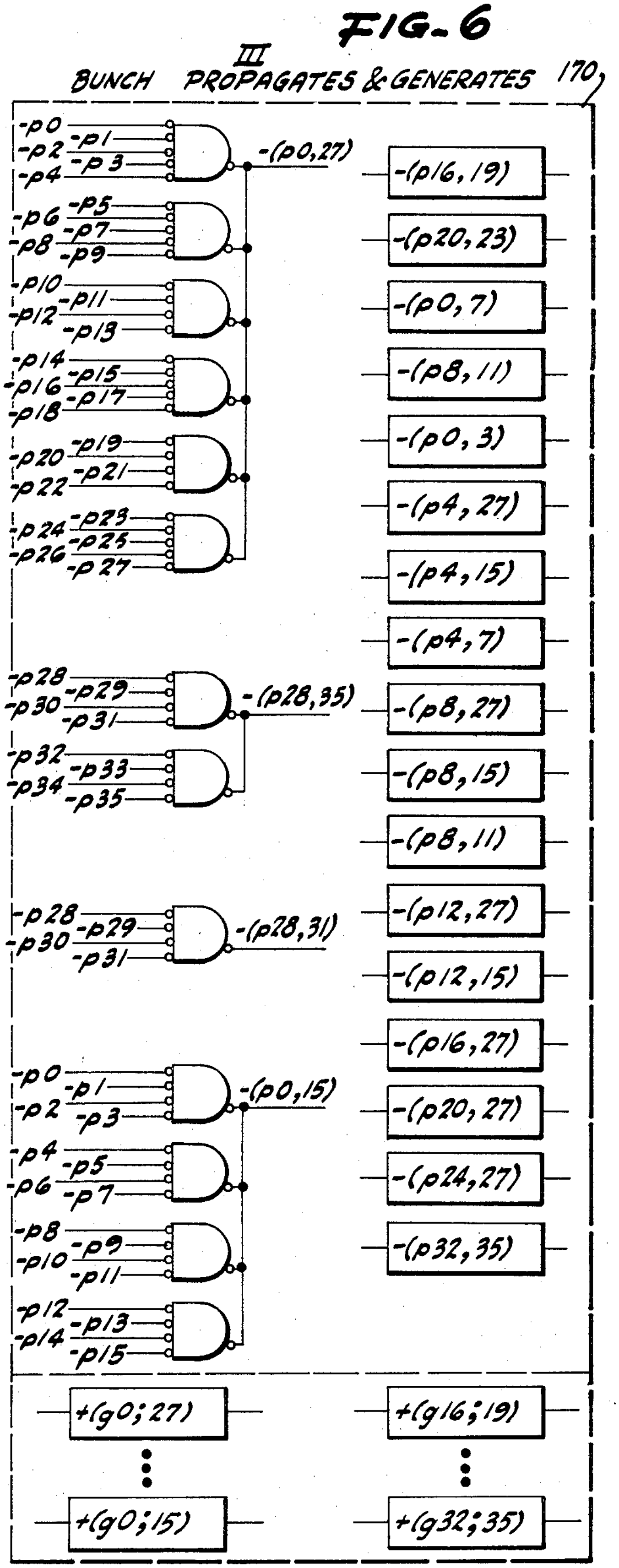
FIG. 6 depicts a schematic representation of the bunch propagates contained within level III of the adder of FIG. 2.

The Z gates of FIG. 5 are used in combination with the bunch propagates and generates of FIG. 6.

BUNCH PROPAGATES AND BUNCH GENERATES

In FIG. 6, the details of the bunch propagates 170 of FIGS. 2 and 4 are shown. The bunch propagates are logically AND'ed with the Z terms outputs from the Z gates of FIG. 5 to form the external carries $Ce$ described hereinafter in further detail. Briefly, the bunch propagates consist of the logical AND of various combinations of the bit propagates $\pm p0, \pm p1, \ldots, \pm p39$. Specifically, the logical AND of bit propagates $p32$, $p33$, $p34$, and $p35$ is indicated by the expression "$(p32, 35)$". Using this symbology, the following bunch propagates are generated:

| | |
|---|---|
| (p0, 27) | (p4, 15) |
| (p28, 35) | (p4, 7) |
| (p28, 31) | (p8, 27) |
| (p0, 15) | (p8, 15) |
| (p16, 19) | (p8, 11) |
| (p20, 23) | (p12, 27) |
| (p0, 7) | (p12, 15) |
| (p8, 11) | (p16, 27) |
| (p0, 3) | (p20, 27) |
| (p4, 27) | (p24, 27) |
| | (p32, 35) |

At the bottom of FIG. 6, the bunch generates are also schematically shown and are derived in the following manner. The bunch generates $+(g0;27)$ signal is produced by circuits identical to the circuits which produce the $-(p0,27)$ signal where the inputs $-p0$ through $-p27$ are identically replaced with the inputs $+g0$ through $+g27$. The output $+(g0;27)$ with such a replacement of inputs represents the logical OR of the $+g0$ through $+g27$ terms. Using this symbology, the following positive bunch generates, collectively represented by +BGi, are produced in the circuitry 170 of FIG. 6:

| | | | |
|---|---|---|---|
| (g0;27) | (g0;7) | (g8;27) | (g20;27) |
| (g28;35) | (g8;11) | (g8;15) | (g24;27) |
| (g28;31) | (g0;3) | (g8;11) | (g32;35) |
| (g0;15) | (g4;27) | (g12;27 | |
| (g16;19) | (g4;15) | (g12;15) | |
| (g20;23) | (g4;7) | (g16;27 ) | |

EXTERNAL CARRIES

Figures 7, 8, 9:
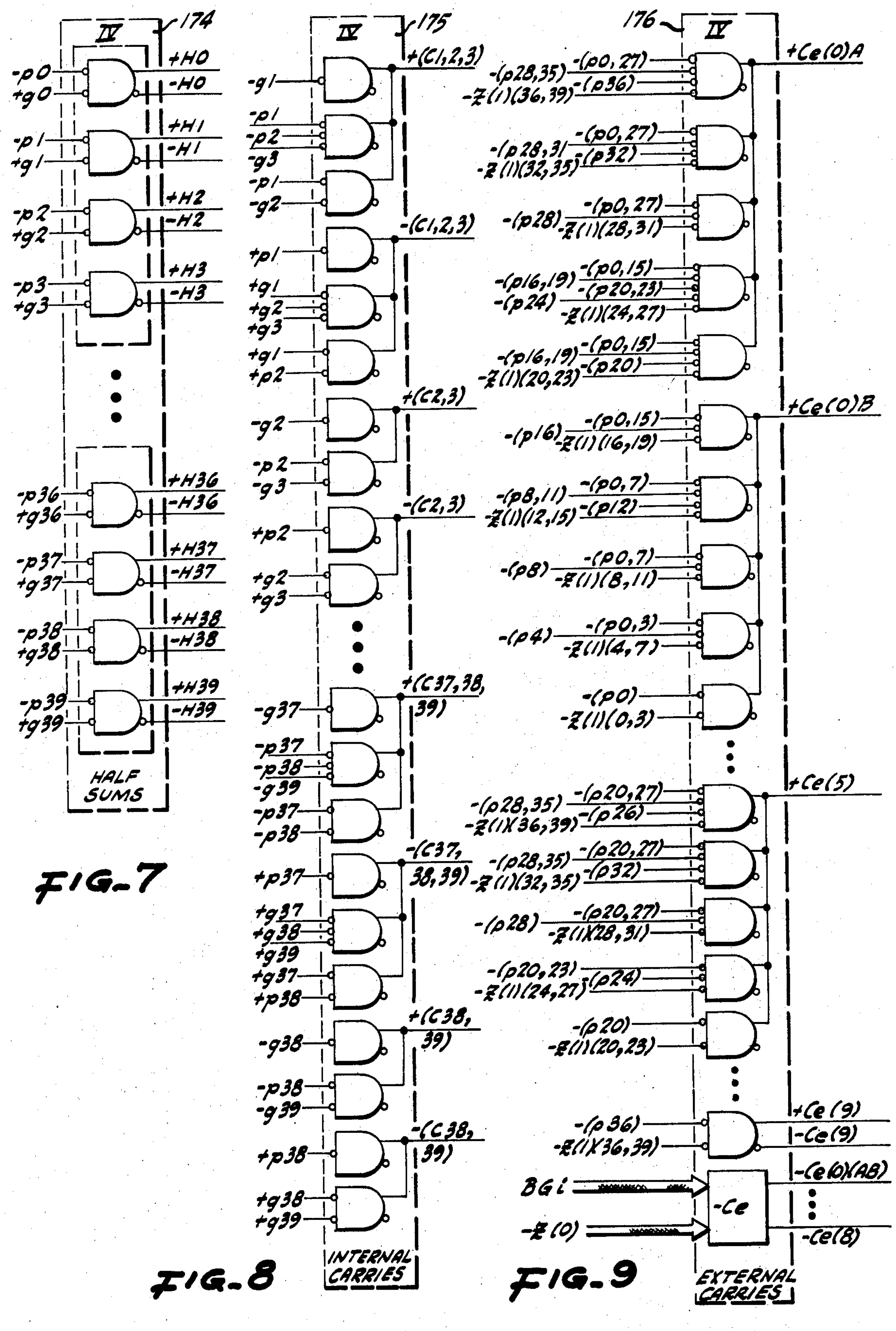
FIG. 7 depicts a schematic representation of the half-sums associated with level IV in the adder of FIG. 2.
FIG. 8 depicts a schematic representation of the internal carries associated with level IV of the adder of FIG. 2.
FIG. 9 depicts a schematic representation of the external carries employed within level IV of the adder of FIG. 2.

The external carries 176 in FIG. 2 and FIG. 4 function to combine the −Z(1), −Z(0) gate outputs and the bunch propagate outputs BP$i$ and bunch generate outputs BG$i$ to form the external carries ±(C$e$) (0), ±(C$e$) (1), . . . ,±(C$e$) (9). Specifically, the negative bunch propagates BP$i$ are combined with the −Z(1) outputs to form the positive external carries +(C$e$) (0), +(C$e$) (1), . . . , +(C$e$) (9). Similarly, the positive bunch generates BG$i$ are combined with the −Z(0) terms to form the negative external carries −(C$e$) (0), −(C$e$) (1), . . . ,−(C$e$) (9). In FIG. 9, typical circuit arrays are shown for generating the positive external carries. The negative external carries are generated in a fully analagous manner by use of identical circuits where, however, the BG$i$ and −Z(0) inputs are employed instead. It can be readily shown by Boolean Algebra that those inputs produce the desired complements −(C$e$) of the positive carries +(C$e$).

The external carries as follows include the redundancy terms (*pi*) (*gi*) =(*gi*) as can be explained in the following manner. Referring now to the background of the invention, a C(0) carry was identified having a plurality of OR'ed terms in which the fourth term was (*p*0–*p*35) (*g*36). That fourth term may be changed to (*p*0–*p*36) (*g*36) using the redundancy relationship without changing in substance C(0). With this change the first four terms of the C(0) term may be expressed, by factoring (*p*0–*p*36) as follows: (*p*0–*p*36) [(*p*37, *p*38, *g*39)V(*p*37, *g*38)V(*g*37) V(*g*36)].

Using well-known Boolean Algebra, the bracketed portion of that factored expression can be shown to be identical to the Z term –Z(1) (36,39) previously given under the Z gates description hereinbefore. As used in the following description of the external carry +C*e*(0) that Z(1) (36,39) term when multiplied by the (*p*0–*p*36) factor contains the redundancy relationship (*pi*) (*gi*) = (*gi*) as previously explained. Similarly, each of the other terms in the external carries contain the redundancy terms in accordance with the present invention.

+C*e*(0) = (*p*0,27) (*p*28,35) (*p*36) (Z(1) (36,39))
V(*p*0,27) (*p*28,31) (*p*32) (Z(1) (32,35))
V(*p*0,27) (*p*28) (Z28,31) (Z(1) (28,31))
V(*p*0,15) (*p*16,19) (*p*20,23) (Z(1) (24,27))
V(*p*0,15) (*p*16,19) (*p*20) (Z(1) (20,23))
V(*p*0,15) (*p*16) (Z(1) (16,19))
V(*p*0,7) (*p*8,11) (*p*12) (Z(1) (12,15))
V(*p*0,7) (*p*8) (Z(1) (8,11))
V(*p*0,3) (*p*4 (Z(1) (24,7))
V(*p*0) (Z(1) (20,3))
+C*e*(1) = (*p*4,27) (*p*28,35) (*p*36) (z(1) (36,39))
V(*p*4,27) (*p*28,31) (*p*32) (Z(1) (32,35))
V(*p*4,27) (*p*28) (Z(1) (28,31))
V(*p*4,15) (*p*16,19) (*p*20,23) (*p*24) (Z(1) (24,27))
V(*p*4,15) (*p*16,19) (*p*20) (Z(1) (20,23))
V(*p*4,15) (*p*16) (Z(1) (16,19))
V(*p*4,7) (*p*8,11) (*p*12) (Z(1) (12,15))
V(*p*4,7) (*p*8) (Z(1) (8,11))
V(*p*4) (Z(1) (4,7))
+C*e*(2) = (*p*8,27) (*p*28,35) (*p*36) (Z(1) (36,39))
V(*p*8,27) (*p*28,31) (*p*32) (Z(1) (32,35))
V(*p*8,27) (*p*28) (Z(1) (28,31))
V(*p*8,15) (*p*16,19) (*p*20,23) (*p*24) (Z(1) (24,27))
V(*p*8,15) (*p*16,19) (*p*20) (Z(1) (20,23))
V(*p*8,15) (*p*16) (Z(1) (16,19))
V(*p*8,11) (*p*12) (Z(1) (12,15))
V(*p*8) (Z(1) (8,11))
+C*e*(2) = (*p*8,27) (*p*28,35) (*p*36) (Z(1) (36,39))
V(*p*8,27) (*p*28,31) (*p*32) (Z(1) (32,35))
V(*p*8,27) (*p*28) (Z(1) (28,31))
V(*p*8,15) (*p*16,19) (*p*20,23) (*p*24) (Z(1) (24,27))
V(*p*8,15) (*p*16,19) (*p*20) (Z(1) (20,23))
V(*p*8,15) (*p*16) (Z(1) (16,19))
V(*p*8,11) (*p*12) (Z(1) (12,15))
V(*p*8) (Z(1) (8,11))
+C*e*(3) = (*p*12,27) (*p*28,35) (*p*36) (Z(1) (36,39))
V(*p*12,27) (*p*28,31) (*p*32) (Z(1) (32,35))
V(*p*12,27) (*p*28) (Z(1) (28,31))
V(*p*12,15) (*p*16,19) (*p*20,23) (*p*24) (Z(1) (24,27))
V(*p*12,15) (*p*16,19) (*p*20) (Z(1) (20,23))
V(*p*12,15) (*p*16) (Z(1) (16,19))
V(*p*12) (Z(1) (12,15))
+C*e*(4) = (*p*16,27) (*p*28,35) (*p*36) (Z(1) (36,39))
V(*p*16,27) (*p*28,31) (*p*32) (Z(1) (32,35))
V(*p*16,27) (*p*28) (Z(1) (28,31))
V(*p*16,19) (*p*20,23) (*p*24) (Z(1) (24,27))
V(*p*16,19) (*p*20) (Z(1) (20,23))
V(*p*16) (Z(1) (16,19))
+C*e*(5) = (*p*20,27) (*p*28,35) (*p*36) (Z(1) (36,39))
V(*p*20,27) (*p*28,31) (*p*32) (Z(1) (32,35))
V(*p*20,27) (*p*28) (Z(1) (28,31))
V(*p*20,23) (*p*24) (Z(1) (24,27))
V(*p*20) (Z(1) (20,23))
+C*e*(6) = (*p*24,27) (*p*28,25) (*p*36) (Z(1) (36,39))
V(*p*24,27) (*p*28,31) (*p*32) (Z(1) (32,35))
V(*p*24,27) (*p*28) (Z(1) (Z(1) (28,31))
V(*p*24) (Z(1) (24,27))
+C*e*(7) = (*p*28,35) (*p*36) (Z(1) (36,39))
V(*p*28,31) (*p*32) (Z(1) (32,35))
V(*p*28) (Z(1) (28,31))
+C*e*(8) = (*p*32,35) (*p*36) (Z(1) (36,39))
V(*p*32) (Z(1) (32,35))
+C*e*(9) = (*p*36) (Z(1) (36,39))

The circuitry of FIG. 9 implements the logical functions indicated by the above equations. Specifically, referring first to +C*e*(0), that equation consists of the logical OR of 10 functions. Each one of those functions is a logical AND. The 10 gates in the top portion of FIG. 9 perform the logical AND functions. Because of fan out limitations of the preferred logical circuit for implementing the logical gates depicted, only five of the output gates are connected in common to perform the logical OR function. The combination of the +C*e*(0)A term and the +C*e*(0)B term in a logical OR circuit produces the +C*e*(0) term of the above equations. The A and B signals are effectively OR'ed in the full sum circuitry, as explained hereinafter in connection with FIG. 10. Because the number of terms decreases for increasing order of the external carries, only the terms corresponding to +C*e*(0) through +C*e*(4) are required to be broken into an A and a B portion. Accordingly, the terms +C*e*(5) through +C*e*(9) have only the single output, one for each polarity for each of those terms.

INTERNAL CARRIES

The internal carries 175 of FIGS. 2 and 4 are depicted in further detail in FIG. 8.

In FIG. 8, the internal carries are generated for groups of four bits with a plus and minus pair for each four bit group. Specifically, for the four bits 0 through 3, the ±(C1,2,3) carries are generated from the –*g*1, –*g*2 and –*g*3 bit generates logically combined with the –*p*1 and –*p*2 propagates to form the positive internal carry. The negative internal carry is generated from the positive inputs of the same bit propagates and generates.

In a similar manner, the ±(C2,3) internal carries for the four bit group 0, 1 2 and 3 are generated by a logical combination of the ±*g*2, ±*g*3 and ±*p*2 signals as indicated in FIG. 8. Each four bit group up to bit 39 generates ± pairs of internal carries. Specifically, the last four bit group, 36 through 39, has the internal carry ±(C37,38,39) and ±(C38,39).

HALF-SUMS

In FIG. 7, the half-sums 174 of FIGS. 2 and 4 are shown in greater detail. The half-sums ±H0, ±H1, . . . ,±H39 are generated from the ± bit propagate and generate signals. Specifically, ±H0 is generated from the $-p0$ and $\pm g0$ signals and so forth until ±H3 is generated from the $-p39$ and the $+g39$ signals.

GROUP PROPAGATES

In FIG. 4, the group propagates 172 are shown in detail. Each four bit group generates a pair of ±group propagates. Specifically, for the group of bits 0, 1, 2 and 3 the $\pm(p1,2,3)$ and the $\pm(p2,3)$ signals are generated from the $-p1$, $-p2$ and $-p3$ bit propagate signals. Similarly, the $\pm(p37,38,39)$ and $\pm(p38,39)$ group propagates are generated from the $-p37$, $-p38$ and $-p39$ bit propagate signals for the four bits 36, 37, 38 and 39.

FULL-SUMS

Figure 10:
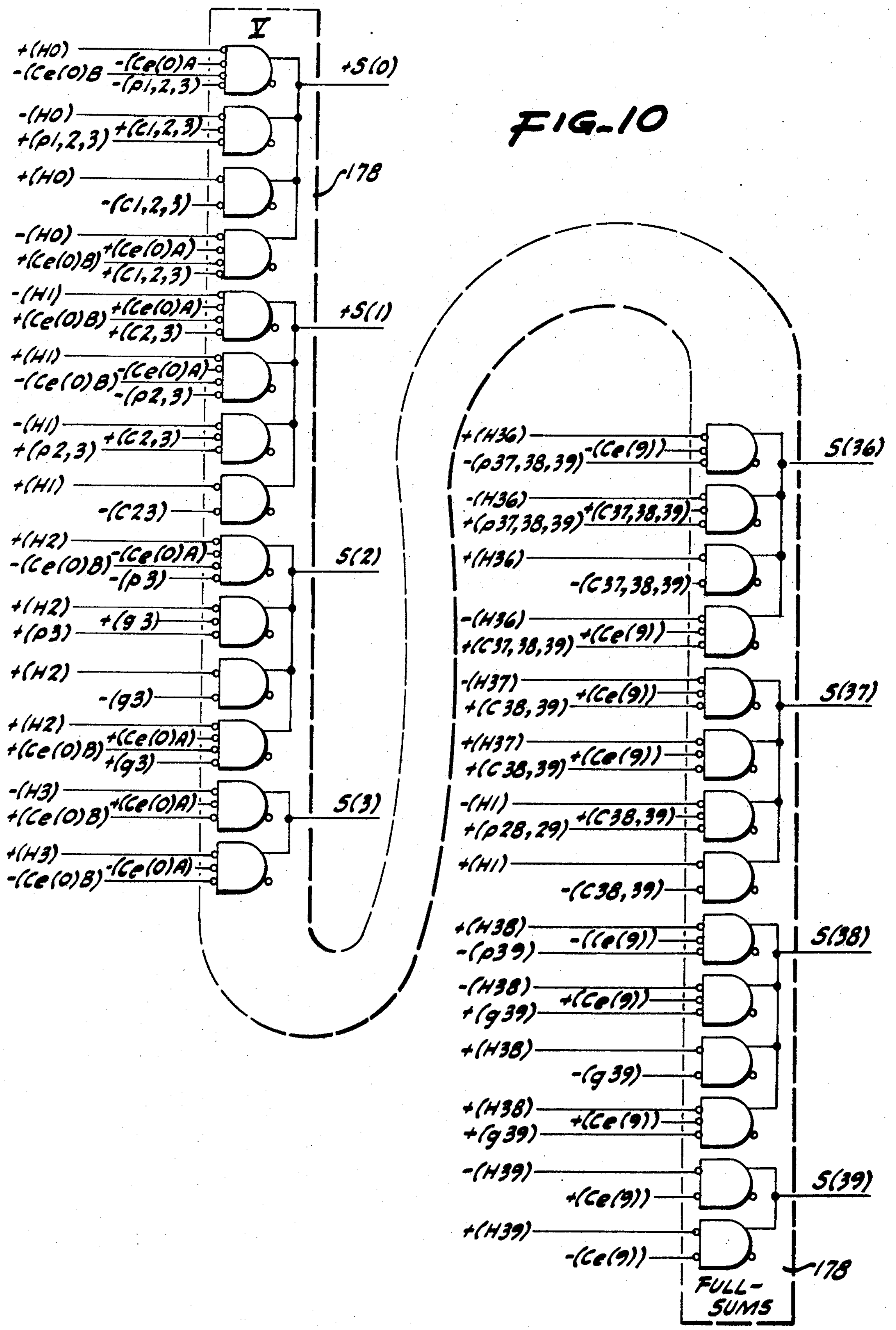
FIG. 10 depicts a schematic representation of the full-sums associated with level V of the adder of FIG. 2.

In FIG. 10, the full-sums circuits of FIGS. 2 and 4 are shown in further detail. The full sums S(0), S(1), . . . S(39) each receive inputs from the group propagates 172, the half-sums 174, the internal carries 175 and the external carries 176.

While the invention has been particularly shown and described with reference to preferred embodiments thereof, it will be understood by those skilled in the art that the foregoing and other changes in form and details may be made therein without departing from the spirit and scope of the invention.

I claim:

1. An adder for adding the N-bit operands A and B to form a full sum, comprising, a first level of logic having ingates for forming dual polarity signals $\pm ai$ for operand A and $\pm bi$ for operand B, where $i$ has the values 0, 1, . . . ,(N−1), a second level of logic including bit propagate circuits for generating the bit propagate signals $\pm pi$ by logically combining said signals $\pm ai$ and $\pm bi$ and bit generate circuits for generating the bit generate signals $\pm gi$ by logically combining said signals $\pm ai$ and $\pm bi$, a third level of logic including a plurality of Z gates for generating Z signals −Z(0) and −Z(1) by logically combining said signals $\pm pi$ and $\pm gi$ selectively from four-bit groups of $\pm pi$ and $\pm gi$, including bunch generate circuits for generating the bunch generate signals BG$i$ by logically combining said signals $\pm pi$ and $\pm gi$, and including bunch propagate circuits for generating the bunch propagate signals BP$i$ by logically combining said signals $\pm pi$ and $\pm gi$ wherein said Z gates, said bunch generate circuits, and said bunch propagate circuits include redundancy terms, a fourth level of logic including group propagate circuits for generating group propagate signals $\pm p(j+1, j+2, j+3)$ and $\pm p(j+1, j+2)$ by logically combining said signals $\pm pi$ selectively from four-bit groups of $\pm pi$, including half-sum circuits for generating the half-sum signals ±H$i$ by logically combining said signals $\pm pi$ and $\pm gi$; including internal carry circuits for generating the internal carry signals $\pm C(j, j+1, j+2)$ and $\pm C(j+1, j+2)$ by logically combining said signals $\pm pi$ and $\pm gi$ in three-bit groups and two-bit groups, respectively, selectively from four-bit groups of $\pm pi$ and $\pm gi$, and including external carry circuits for generating the external carry signals $\pm Ce(i)$ by logically combining said signals Z(0),−Z(1), BP$i$, and BG$i$ where $j$ equals $4i$ for values of $i$ from 0 to (N/4−1), and a fifth level of logic including full-sum circuits for combining said group propagate, said half-sum, said internal carry and said external carry signals to form the full-sum signals S$i$.

2. The adder of claim 1 where said operands A and B are each 40 bits so that $i$ equals 0, 1, . . . ,39 for the bits $ai$ and $bi$.

3. The adder of claim 2 wherein said Z terms are as follows:

$-Z(0)\ (36,39) = (g37)\ (p36)\mathrm{V}(g38)\ (p37)\ (p36)\mathrm{V}(p39)\ (p38)\ (p37)\ (p36)$ $-Z(1)\ (36,39) = (\overline{p37})\ (\overline{g36})\mathrm{V}(\overline{p38})\ (\overline{g37})\ (\overline{g36})\mathrm{V}(\overline{g39})\ (\overline{g38})\ (\overline{g37})\ (\overline{g36})$ $-Z(0)\ (32,35) = (g33)\ (p32)\mathrm{V}(g34)\ (p33)\ (p32)\mathrm{V}(p35)\ (p34)\ (p33)\ (p32)$ $-Z(1)\ (32,35) = (\overline{p33})\ (\overline{g32})\mathrm{V}(\overline{p34})\ (\overline{g33})\ (\overline{g32})\mathrm{V}(\overline{g35})\ (\overline{g34})\ (\overline{g33})\ (\overline{g32})$

.
.
.

$-Z(0)\ (0,3) = (g1)\ (p0)\mathrm{V}(g2)\ (p1)\ (p0)\mathrm{V}(p3)\ (p2)\ (p1)\ (p0)$ $-Z(1)\ (0,3) = (\overline{p1})\ (\overline{g0})\mathrm{V}(\overline{p2})\ (\overline{g1})\ (\overline{g0})\mathrm{V}(\overline{g3})\ (\overline{g2})\ (\overline{g1})\ (\overline{g0})$.

4. In a data processing system, a carry-lookahead adder for adding an operand A including the bits $a0$, $a1$, . . . ,$a39$ and an operand B including the bits $b0$, $b1$, . . . ,$b39$ to provide a final sum including the bits S(0), S(1), . . . ,S(39), comprising, a first level of logic including complementing ingates for providing the double polarity bit signals $\pm a0$, $\pm a1$, . . . ,$\pm a39$ and $\pm b0$, $\pm b1$, . . . ,$\pm b39$ from the operand A and B bits, a second level of logic including bit propagate circuits for logically OR'ing the bit signals $\pm a0$, $\pm a1$, . . . ,$\pm a39$ and $+b0$, $b1$, . . . ,$+b39$ to form the bit propagate signals $\pm p0$, $\pm p1$, . . . ,$\pm p39$ and including bit generate circuits for logically AND'ing the bit signals $-a0$, $-a1$, . . . ,$-a39$ and $-b0$, $-b1$, . . . ,$-b39$ to generate the bit generate signals $\pm g0$, $\pm g1$, . . . ,$\pm g39$, a third level of logic including Z gates for logically combining the bit propagate and bit generate signals $\pm pi$ and $\pm gi$ to form the −Z(0) and −Z(1) signals as follows:

$-Z(0)\ (36,39) = (g37)\ (p36)\mathrm{V}(g38)\ (p37)\ (p36)\mathrm{V}(p39)\ (p38)\ (p37)\ (p36)$ $-Z(1)\ (36,39) = (\overline{p37})\ (\overline{g36})\mathrm{V}(\overline{p38})\ (\overline{g37})\ (\overline{g36})\mathrm{V}(\overline{g39})\ (\overline{g38})\ (\overline{g37})\ (\overline{g36})$ $-Z(0)\ (32,35) = (g33)\ (p32)\mathrm{V}(g34)\ (p33)\ (p32)\mathrm{V}(p35)\ (p34)\ (p33)\ (p32)$ $-Z(1)\ (32,35) = (\overline{p33})\ (\overline{g32})\mathrm{V}(\overline{p34})\ (\overline{g33})\ (\overline{g32})\mathrm{V}(\overline{g35})\ (\overline{g34})\ (\overline{g33})\ (\overline{g32})$

.
.
.

$-Z(0)\ (0,3) = (g1)\ (p0)\mathrm{V}(g2)\ (p1)\ (p0)\mathrm{V}(p3)\ (p2)\ (p1)\ (p0)$ $-Z(1)\ (0,3) = (\overline{p1})\ (\overline{g0})\mathrm{V}(\overline{p2})\ (\overline{g1})\ (\overline{g0})\mathrm{V}(\overline{g3})\ (\overline{g2})\ (\overline{g1})\ (\overline{g0})$ and including bunch propagate circuits for generating the bunch propagate signals BPi as follows:

| | | | |
|---|---|---|---|
| −(p0,27) | −(p20,23) | −(p4,15) | −(p12,27) |
| −(p28,35) | −(p0,7) | −(p4,7) | −(p12,15) |
| −(p28,31) | −(p8,11) | −(p8,27) | −(p16,27) |
| −(p0,15) | −(p0,3) | −(p8,15) | −(p20,27) |
| −(p16,19) | −(p4,27) | −(p8,11) | −(p24,27) |
| | | | −(p32,35) |

and including bunch generate circuits for generating the bunch generate signals BGi as follows:

| | | | |
|---|---|---|---|
| +(g0;27) | +(g20;23) | +(g4;15) | +(g12;27) |
| +(g28;35) | +(g0;7) | +(g4;7) | +(g12;15 |
| +(g28;31) | +(g8;11) | +(g8;27) | +(g16;27) |
| +(g0;15) | +(g0;3) | +(g8;15 ) | +(g0;27) |
| +(g16;19) | +(g4;27) | +(g8;11) | +(g24;27) |
| | | | +(g32;35) |

a fourth level of logic including group propagate circuits for generating group propagate signals ±(p1,2,3) and ±(p2,3), ±(p5,6,7) and ±(p6,7), . . . ,±(p37,38,39) and ±(p38,39); including half-sum circuits for generating the half-sum signals ±H0, ±H1, . . . ,±H39, and including internal carry circuits for generating internal carry signals ±(C1,2,3) and ±(C2,3), ±(C5,6,7) and ±(C6,7), . . . ,±(C37,38,39) and ±(C38,39); and including external carry circuits for combining said –Z(1) signals and said bunch propagate signals BP*i* signals to form external carry signals +C*e*(0), +(C*e*(1), . . . ,+Ce(9) and for combining said –Z(0) signals and said bunch generate signals BG*i* to form external carry signals –C*e*(0), C*e*(1), . . . ,–C*e*(9), and a fifth level of logic including full-sum circuits for combining said group propagate, said half-sum, said internal carry and said external carry signals to provide the final sum S(0), S(1), . . . ,S(39).

5. An adder for adding the operands A and B each defined by a plurality of bit signals to form a full-sum S, comprising, bit propagate circuit means for generating bit propagate signals by logically combining said bit signals, bit generate means for generating bit generate signals by logically combining said bit signals, Z gate circuit means for generating Z signals by logically combining said bit propagate and said bit generate signals selectively in groups, bunch generate circuit means for generating bunch generate signals by logically combining said bit generate and said bit propagate signals, bunch propagate circuit means for generating bunch propagate signals by logically combining said bit propagate and said bit generate signals, said Z gate circuit means, said bunch generate circuit means, and said bunch propagate circuit means collectively including circuit means defining redundancy terms of the form (*pi*) (*gi*) = (*gi*) or (–*pi*) (–*gi*) = (–*pi*) where (*pi*) represents a typical bit propagate signal and where (*gi*) represents a typical bit generate signal, group propagate circuit means for generating group propagate signals by logically combining said bit propagate signals, half-sum circuit means for generating half-sum signals by logically combining said bit propagate and said bit generate signals, internal carry circuit means for generating internal carry signals by logically combining said bit propagate and said bit generate signals, external carry circuit means for generating external carry signals by logically combining said Z signals, said bunch propagate signals, and said bunch generate signals, and full-sum circuit means for logically combining said group propagate, said half-sum, said internal carry and said external carry signals to form said full-sum S.

* * * * *

PO-1050
(5/69)

UNITED STATES PATENT OFFICE
CERTIFICATE OF CORRECTION

Patent No. 3,805,045 Dated April 16, 1974

Inventor(s) DEE E. LARSEN

It is certified that error appears in the above-identified patent and that said Letters Patent are hereby corrected as shown below:

IN THE CLAIMS:

Claim 1, column 9, line 66, cancel "Z(0), -Z(1)" and substitute therefor -- -Z(0), -Z(1) --.

Signed and sealed this 10th day of September 1974.

(SEAL)
Attest:

McCOY M. GIBSON, JR.
Attesting Officer

C. MARSHALL DANN
Commissioner of Patents

-27941